W. J. BEATTIE.
FOLDING MACHINE.
APPLICATION FILED MAY 21, 1908.

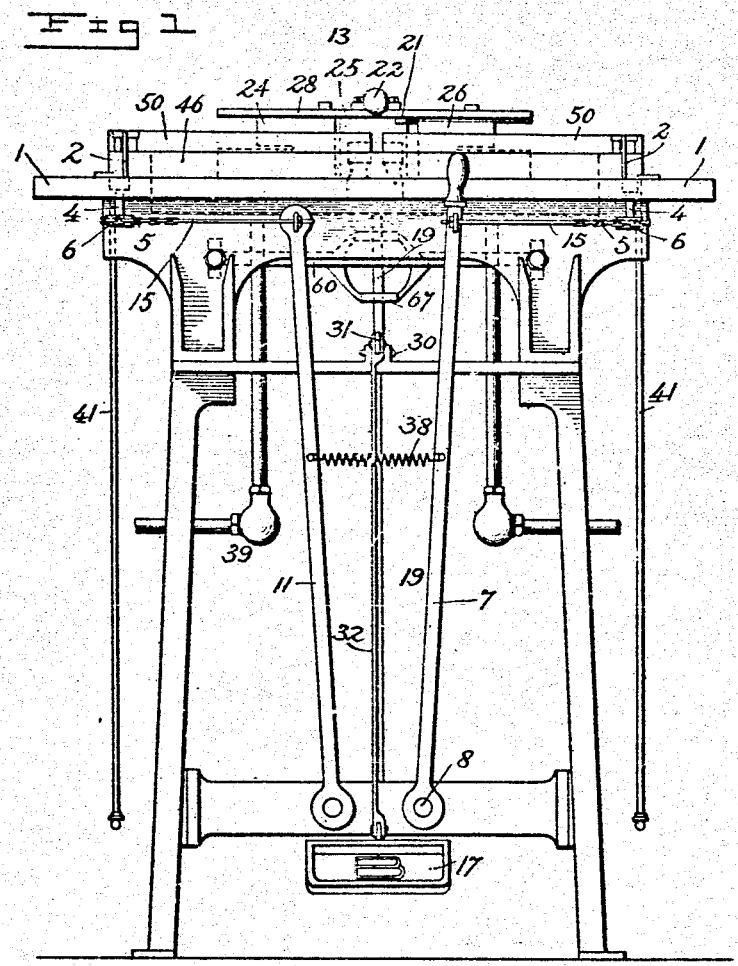

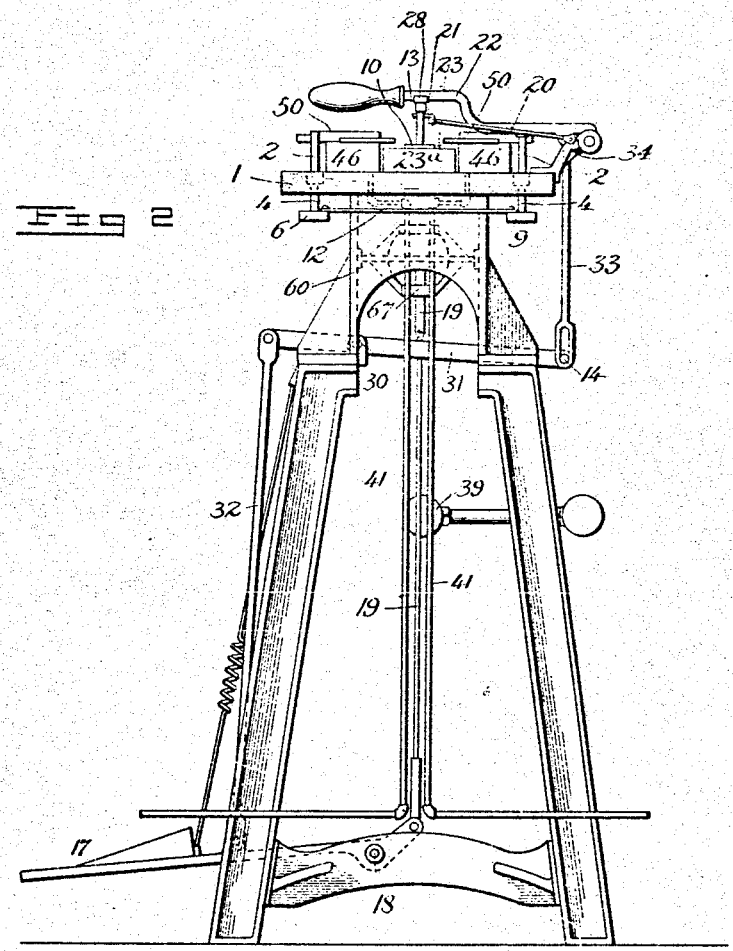

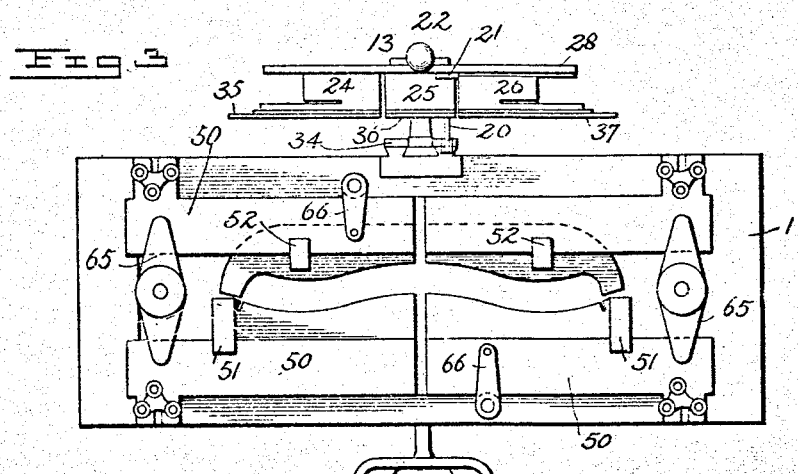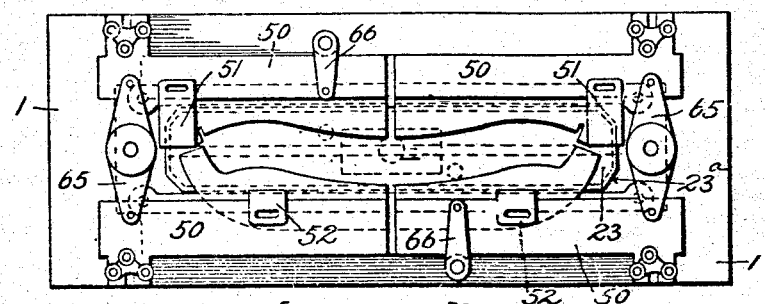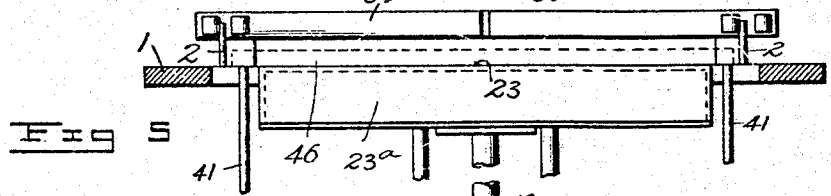

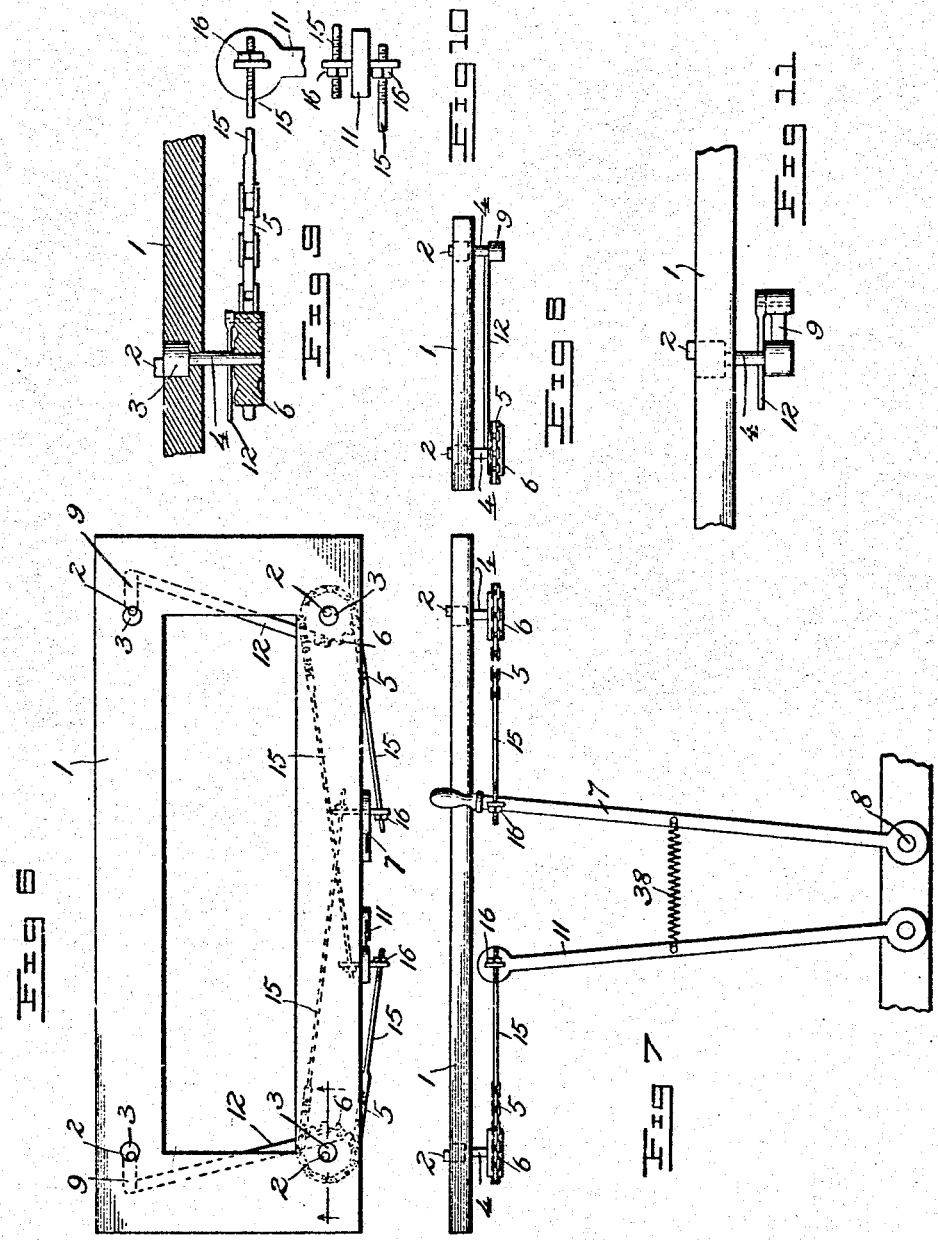

972,320.

Patented Oct. 11, 1910.
7 SHEETS—SHEET 5.

Inventor
Walter John Beattie

By Walter E. Ward.
Attorney

Witnesses

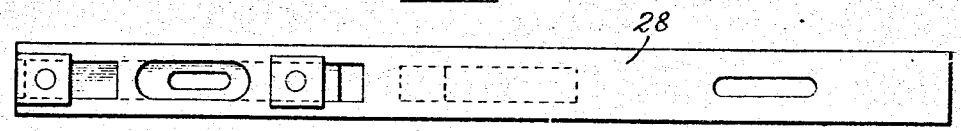
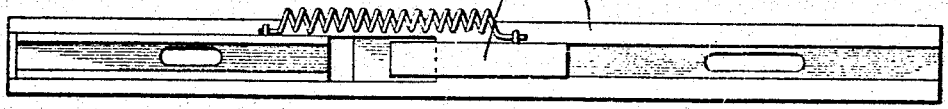
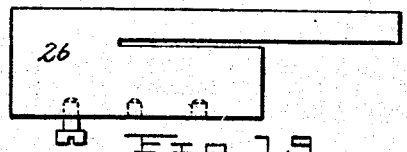
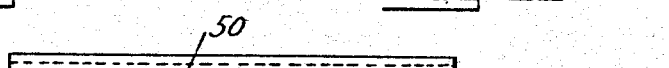
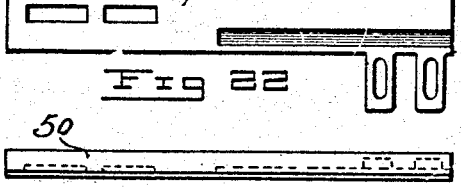

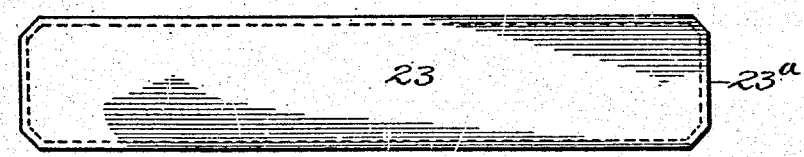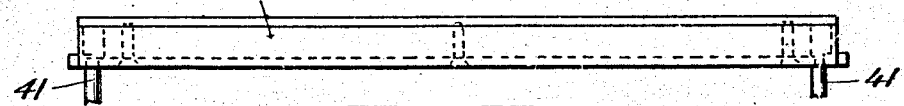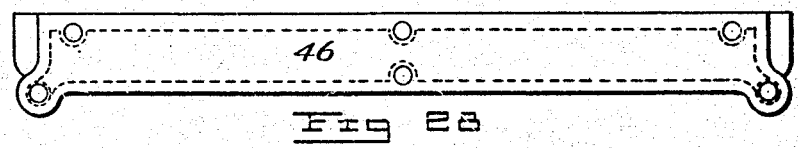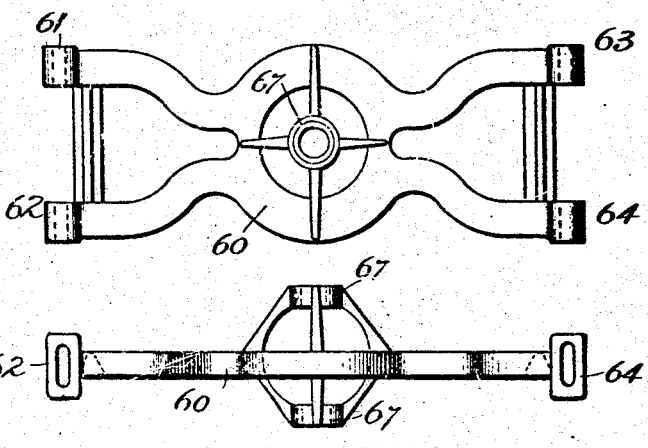

UNITED STATES PATENT OFFICE.

WALTER JOHN BEATTIE, OF COHOES, NEW YORK, ASSIGNOR, BY MESNE ASSIGNMENTS, TO THE BEATTIE MANUFACTURING COMPANY OF COHOES.

FOLDING-MACHINE.

972,320.      Specification of Letters Patent.      Patented Oct. 11, 1910.

Application filed May 21, 1908. Serial No. 434,132.

*To all whom it may concern:*

Be it known that I, WALTER JOHN BEATTIE, a citizen of the United States, residing at Cohoes, in the county of Albany and State of New York, have invented certain new and useful Improvements in Folding-Machines, of which the following is a specification.

My invention relates to machines for folding collar and cuff blanks and the objects of my invention are to construct a machine the folder plates of which will be heated, and the folding and pressing of the goods will be over the edges of the die while the die is upon the blank upon the bed plate of the machine.

The invention also consists of novel construction and combination of parts hereafter more particularly described.

I accomplish these objects by means of mechanism illustrated in the accompanying drawings, in which:—

Figure 12:
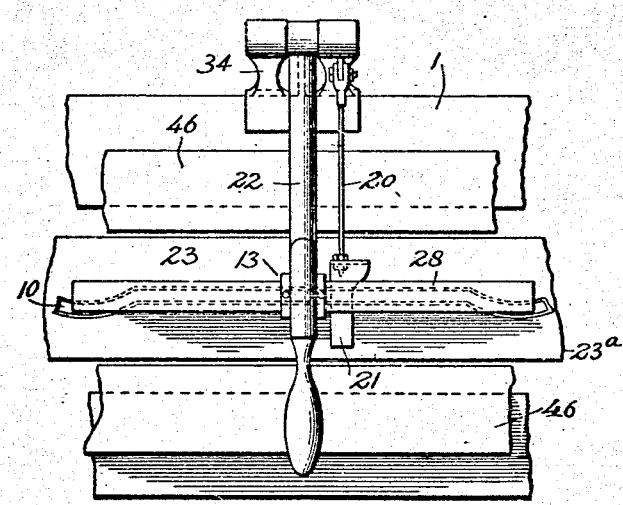
Figure 14:
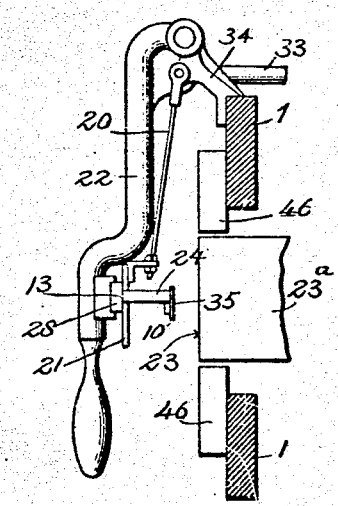
Figure 13:
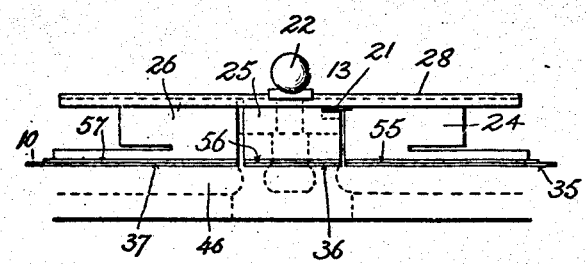

Figure 1 is a front elevation of my improved folding machine; Fig. 2, an end elevation of the same; Fig. 3, a top plan view; Fig. 4, a plan view of the mechanism operating the folder plates; Fig. 5, a vertical longitudinal sectional view of the top plate of the machine, showing the bed plate and folder plate in elevation; Fig. 6, a plan of the top plate of the machine showing the mechanism for operating the folder plates; Fig. 7, a front elevation of the same; Fig. 8, an end view of the same; Figs. 9, 10, and 11 are detail views showing the mechanism for operating the folder plates; Fig. 12, a top plan view enlarged of the die and its operating mechanism and associated parts of the machine; Fig. 13, a front elevation; Fig. 14, an end elevation of the same; Figs. 15 to 21 are detail views of various parts of the die head; Fig. 22, a plan view, and Fig. 23, a front elevation of one of the folder plates; Fig. 24, an elevation, and Fig. 25, a plan view of the bed plate; Fig. 26, an elevation, and Fig. 27, a plan view of one of the fixed heating boxes, and Figs. 28 and 29, detail views of a portion of the frame work.

Similar numerals refer to similar parts throughout the several views.

The reference character 1 designates the top surface plate or table of the machine. Upon this table the folding and pressing of the collar and cuff blanks take place. The folder-plates are located upon the top of the table 1 and are four in number and are arranged to move inwardly, folding the edges of the goods over the die upon the heated bed plate of the machine. This top surface plate or table of the machine does not have a continuous solid surface, but has an open center in which the heated bed plate of the machine is located, the top surface of which extends above the top surface of the table. The folding and pressing are done upon this heated bed plate which is vertically movable, and the folder-plates fold the goods over the die upon this bed-plate as is described in United States Patent No. 666,766 issued January 29, 1901 to John Maitland and myself. The folder plates are operated by cranks 2, 2, attached to the revolving disks 3, outside of the center of the disks. There are four movable folder-plates which are operated by four cranks 2 working in suitable bearings in the folder-plates and imparting the motion of an arc of a circle to them, moving them inward toward a die 10, when the die rests upon the goods upon the bed plate, and folds the goods on all sides over the edges of the die as described in the former patent to Maitland and myself.

The revolving disks 3 are mounted upon shafts 4. Two of the revolving disks are located in front of the machine and two in the rear. Attached to the lower ends of the shafts 4 in the front of the machine are sprocket gears 6, engaging with the sprocket chains 5. The sprocket chains 5 are short, occupying simply the sprocket gears. Attached to each end of the sprocket chains are extension rods 15. One extension rod 15 of each sprocket is attached at one end to the lever 7, and the other extension rod 15 is attached to the lever 11. Lever 7 is fulcrumed at its lower end to the stationary part of the machine at 8, and is movable sidewise by the person operating the machine. Lever 11 is likewise fulcrumed at the lower part of the machine, but has no handle for the person operating the machine.

12, 12 are two connecting links connecting the respective sprocket wheels 6 to arms 9 on the rear shafts 4 so that an operator moving the lever 7 by hand moves all four disks simultaneously. By moving the lever 7 to the right (Fig. 7) the extension rod 15 will move the left hand sprocket wheel 5, which at the same time, by means of the extension rod 15 attached to the lever 11 will move the lever 11 to the left, which will at the same time, by means of the extension rod attached to the right hand sprocket wheel move that sprocket wheel. The two sprocket wheels moving the two front revolving disks will at the same time and by the same movement revolve the revolving disks in the rear by means of the connecting links 12, 12, thus all of the revolving disks will be moved by one operation simultaneously and the cranks 2 will likewise move the folding plates inward.

38 is a spring between the levers 7 and 11. When those two levers are moved from each other as described the spring expands. When the power is removed the force of the spring 38 will bring the levers back toward each other and they will resume their normal position. The reverse motion also at the same time takes place in the sprockets and revolving disks, and the folding plates are thus removed from over the goods on the die 10. The lost motion between the sprockets and the levers is taken up by means of the nuts 16 meshing with the screw threads on the ends of the extension rods 15. This also allows for the proper adjustment of the revolving disks and the cranks 2.

In order to press the blanks successfully it is necessary that the bed-plate and the folder-plates be thoroughly heated when the pressing takes place.

23 is the heated bed plate of the machine. The heated bed plate is here shown as the top surface of a chamber 23ª heated by steam or by any suitable means. It is vertically movable by means of the foot pedal 24, turning upon the fulcrum 25, and pushing upward the rod 27 which bears against the bottom of the movable heated box or chamber the top of which forms the heated bed-plate 23 and presses it upward. When the folder-plates have folded the goods over the die 10 and the goods are ready to be pressed the pressure is applied to the foot pedal 17 and the heated bed plate is moved upward, and the goods are thus pressed over the edges of the die. When the pressing is completed the pressure is removed from the foot pedal 17 and the heated bed plate under the die drops down. The folder-plates are removed from over the die 10 by the spring 38 drawing the levers 7 and 11 toward each other as above described. The goods are pressed over the edges of the die and released therefrom as hereinafter described. When the die-head is raised it moves the heated bed plate 23 upward until it comes in contact with the bottom of those portions of the folder-plates 50 which extend over the edge of the heated bed-plate. This raising of the heated bed plate 23 is accomplished as follows: A connecting rod 33 is pivoted to the handle 22 of the die head 13 in front of a bracket 34 on the table 1 to which said handle is hinged. Therefore, the raising of the handle 22 pulls the connecting rod 33 upwardly. The connecting rod 33 is loosely pivoted to a cross-arm or lever 31 by means of a pin 14 on said arm seated in a vertical slot in the lower end of the connecting rod 33. The cross arm 31 is fulcrumed to the machine at 30 near the other end so that when the handle 22 is raised the rod 33 draws up the end of the cross arm 31 and turns the cross arm 31 upon the fulcrum 30 and presses downward the other end, which in turn presses downward the rod 32 connecting that end of the cross arm 31 with the foot pedal 17. This presses downward the foot pedal 17 which, turning upon its fulcrum 18 presses upward the rod 19, and thus raises the heated bed plate 23 to a position that its top surface will be against the lower surface of that portion of the folding-plates 50 which extends over the heated bed-plate when at rest. By reason of the loose connection between the rod 33 and the cross-arm 31 there is a small amount of lost motion, the object of which is to enable the die head and the bed plate to move independently of each other for a short distance. As before stated it is found that the pressing of the folds of the blanks is much more successful when the folder-plates as well as the bed-plate are hot. The reason for raising the bed-plate against the edge of the folder plates as above described is to keep that part of the movable folder plates heated so that when they move over the goods they will be hot. In order to also keep the main portion or body of the folder-plates 50 hot, I provide stationary heating boxes, 46, 46 in contact with the under side of said folder-plates when the folder-plates are at rest. These boxes are on each side of the machine and may rest upon the top surface plate or table 1 of the machine, as shown in Figs. 1, 2, 12 and 14 and may be heated by any convenient means. The top surface of the boxes 46 are even with the top surface of the heated bed plate 23 when raised so that when the folder-plates 50 are at rest they will lie upon the top of these heated boxes and thus become thoroughly heated and then when they are moved over the die they will be hot so as to make a successful fold. In the present instance, the boxes 46 are heated by steam conducted thereto by pipes 41, as shown in Figs. 1, 5 and 26. The folder-plates do not move back far enough to allow the entire plate to rest over the stationary heated boxes 46 but the edges of the movable folder-plates remain over the movable heated bed-plate. Therefore, I employ the means above described for raising the bed-plate when the die is raised so that the bed plate will transmit a portion of its heat to the movable folder-plates. If the bed-plate is not raised in this way at each operation the contact between the top of the heated bed-plate and the bottom of the edges of the movable folder-plates will not be perfect and the folder-plates will not be sufficiently heated.

The collar and cuff blanks to be pressed are of irregular shape, and the styles, especially of the collars, are constantly changing. In the drawings, I have shown a die 10 for folding a collar blank which is of the same shape and size as the collar. I make my die plate of very thin spring steel, and preferably in three sections 35, 36 and 37, see Fig. 13. To the die handle 22 I rigidly attach a bar 28 at right angles to said handle 22 and extending over the bed-plate 23, said bar being about the same length as the collar blank. To the bar 28 I fasten the die 10, preferably by means of the die head 13, partly formed of the intermediate plates 24, 25 and 26 to which are removably connected the respective sections 35, 36 and 37 of the die. The central plate is rigidly attached to the plate 28; one of the side plates, in this case plate 24, is attached slidably to the bar 28, and the other plate 26, I adjustably attach thereto, so as to lengthen the die 10 to suit the size of the collar. The plate 26 may be adjusted on the bar 28 by means of set-screws 30ˣ.

20 is a link arm shorter than the handle 22 and pivoted on the machine within the hinge of the handle 22 as shown in Figs. 12 and 14.

21 is a wedge or cam attached to the end of link 20 and adapted to be inserted between the plates 24 and 25, 25 being rigidly attached to the bar 28 and 24 being slidably attached to said bar. The cam 21 is adapted to slide the plate 24, carrying the end section 35 of the die 10 lengthwise, the link 20 being slightly shorter than the handle 22 and hinged at a point inside of the hinge of said handle. When the handle 22 is brought down, so that as the die is pressed upon the bed plate 23, the cam 18 is forced between the plates 24 and 25 and forces the plate 24, carrying the end sections 35 of the die outwardly and thus expands the die so that it occupies the space desired upon the blank resting upon the bed plate 23. When the die head 13 is raised by the handle 22 the link 20 draws the cam 21 out from between the plates 24 and 25 and the spring 27 draws the plate 24 back against the plate 25 and draws the die section 35 out from the fold of the blank which has been pressed over the edge of the die so that the blank may be removed by the operator without interfering with the fold of the blank. The die blade is made of very thin spring steel and may be reinforced for part of its width where it is joined to the plates, 24, 25 and 26 by reinforcing plates 55, 56 and 57, see Fig. 13, which are fixedly attached to the plates 24, 25 and 26 and to which the die blade sections are removably attached. The die blades are so attached that they may be readily removed and others substituted of the various size and shapes to form the style of collar or cuff desired. The plate 26 is adjustable on the plate 28 as to length only.

The top surface of the vertically movable steam chest 23 being the bed plate upon which the pressing is done and being vertically movable, steam is supplied through any suitable means as by the universal ball joints 39, and a similar joint is used to allow the condensed steam to drip from the steam chest. This universal ball joint also overcomes the cranking due to the contraction and expansion of the steam pipes.

Figs. 28 and 29 show a spider 60, the four corners 61, 62, 63 and 64 of which are rigidly attached to substantial parts of the machine, while in the center are bearings 67 to guide the rod 19 attached to the treadle 17 for raising the bed-plate 23, said bearings make a solid and substantial support so as to move the bed-plate 23 evenly and positively.

51, 52, 65, 66 are braces or fingers which are attached to substantial parts of the machine and rest over the folder-plates when the folder-plates are folding the goods over the die, so that when the pressure is exerted upon the foot pedal 17 and the bed plate 23 pressed upward the braces will hold the folder plates down and the goods will be thoroughly pressed with as much force as is desired between the folder-plates and the bed-plate of the machine over the edges of the die.

Folder plates are here shown to be heated by stationary boxes located under them containing a heating medium, but the folder plates may also be made hollow and heated by electricity, for which I have filed a divisional application. Constructed in this manner the folder plates are always hot when they are moved inward to fold the edges of the goods over the die and make a smooth uniform fold over the thin die. The die is so thin that it is heated by the bed-plate and the folder-plates. The die remains within the fold until after the folder-plates are removed and then as the die head is raised the die contracts automatically and withdraws from the folds of the goods and leaves the folds smooth and uniform in the best possible condition for stitching.

To operate the machine, the handle 22 with the die is raised as high as necessary to leave the bed plate free for the placing of a blank thereon. This movement of the handle raises the connecting rod 33 and through the lever 31 and other connecting parts the rod 19 is raised to carry the bed plate against the under surface of the folder plates in order to keep them hot, these folder plates, it is understood, being in their retracted positions, so that a blank will rest wholly on the bed plate. The die is now lowered onto the blank, this movement also lowering the bed-plate slightly, the differences in movement of the two being compensated for by lost motion between the connecting rod 33 and the lever 31. Pressure is now applied to the treadle 17 to raise the bed plate 23ª against the folder plates, at the same time rocking the cross-arm 31, the pin 14 moving upwardly in the slot at the lower end of the connecting rod 33 leaves the die undisturbed on the bed plate. The lever 7 is now swung to the right and through the mechanism described, turns the crank pins 2 and slides the folder plates inwardly, turning the edges of the blank over the edges of the die, and holding them in this position, after which, pressure is exerted on the treadle 17 to force the bed-plate 23 against the folded blank, and the latter against the folder plates with the edges of the die between the body of the blank and the turned edges thereof. When the handle 22 was raised the cam 21 was withdrawn from between the die supporting plates 25 and 26, thus shortening the die, but upon lowering the handle said cam plate 21 was forced between the two die supporting plates and the die extended to its proper length, as previously described. After sufficient pressure has been applied to insure a perfect fold, the treadle 17 is released, and the bed plate with the die and folded blank thereon drops a short distance below the folder plates, which latter return to their outer position when the hand is removed from the lever 7. The handle 22 is again raised and the cam plate withdrawn so that the die may be shortened by inward movement of the sliding die plate 26 under the influence of the spring 27, and thus permit the easy removal of the folded blank from the die.

What I claim as my invention and desire to secure by Letters Patent is:

1. In a machine for folding collar and cuff blanks, a heated bed plate, a heater on each side of said bed plate, independent means for heating said bed plate and each heater, slidable folder plates supported directly on said heaters to be heated thereby, a movable die adapted to coöperate with the bed plate for holding the blanks thereon while being folded and pressed, means for operating the folder plates to fold the blanks over the die edges, and means for pressing the folds of the blank between the bed plate and the folder plates and over the edges of the die.

2. In a machine for folding collar and cuff blanks, a vertically movable bed plate, a fixed heater on each side of said bed plate, separate means for heating said bed plate and each heater, slidable folder plates supported directly on said heaters to be heated thereby, a movable die adapted to coöperate with the bed plate for holding the blanks thereon while being folded and pressed, means for operating the folder plates to fold the blanks over the die edges, and means for pressing the heated bed plate with the folded blank thereon against the heated folder plates.

3. In a machine for folding collar and cuff blanks, a fixed table, a bed plate vertically movable therethrough, a heated box fixed to said table on each side of said bed plate, separate means for heating said bed plate and each heating box, slidable folder plates supported directly on said boxes to be heated thereby, a die for holding blanks on said bed plate while the edges of said blanks are folded over the edges of said die by the folder plates, means for operating said folder plates, and means for causing the heated bed plate to press the edges of the blanks folded over the die against the heated folder plates.

4. In a machine for folding collar and cuff blanks, a vertically movable bed plate, a fixed heater on each side of said bed plate, separate means for heating said bed plate and each heater, slidable folder plates supported directly on said heaters to be heated thereby, a movable die arranged to coöperate with the bed plate for holding blanks thereon while being folded and pressed, means for operating the folder plates to fold the blanks over the die edges, means for moving said heated bed plate vertically to press the blank folded about said die edges against the heated folder plates, and connections between the die and the heated bed plate adapted to lift said bed plate into contact with said folder plates when the die is raised.

5. In a machine for folding collar and cuff blanks, a vertically movable bed plate, a fixed heater on each side of said bed plate, separate means for heating said bed plate and each heater, slidable folder plates supported directly on said heaters to be heated thereby, a vertically movable die arranged to coöperate with the bed plate for holding blanks thereon while being folded and pressed, means for operating the folder plates to fold the blanks over the edges of the die, means for raising the bed plate into contact with the folder plates for pressing the blanks, connections between the die-head and the bed plate for lifting said bed plate into contact with said folder plates at the time when the die is raised to permit removal of the finished blanks from said die, and means operated by the movement of the die-head for varying the length of the die.

6. In a machine for folding collar and cuff blanks, a vertically movable bed plate, a die of thin sheet material comprising a fixed section and a slidable section, said die adapted to clamp blanks upon the bed plate, slidable folder plates adapted to fold the edges of said blanks over the edges of said die, means for raising the bed plate to press the folded blanks against the folder plates, means for supporting and lowering said die, and connections operated by said means for moving the slidable die section endwise to lengthen the die as said die is lowered.

7. In a machine for folding collar and cuff blanks a heated bed-plate, a die head, a thin metallic die attached to said die head and adapted to press upon the blank upon the bed-plate, folder-plates adapted to be moved so as to fold the blank over said die, circular disks in front of said machine, pins attached eccentrically to said circular disks and serving to operate said folding-plates as the disks are revolved, sprocket wheels attached to said circular disks, levers connected to said sprocket wheels, circular disks in the rear of said machine, and links connecting the circular disks in the front of the machine with the circular disks in the rear of the machine, whereby manipulation of said levers will operate all four disks simultaneously to move the folder plates simultaneously over the die, substantially as described.

8. In a machine for folding collar and cuff blanks, a die therefor of thin sheet material formed of a plurality of sections, one of which is slidable longitudinally of the die, a swinging die-head supporting said die, means engaging said slidable die-section to move the same, and a connection attached to said moving means and hinged to a fixed part of the machine eccentric to the axis of oscillation of the die head.

In testimony whereof I affix my signature in presence of two witnesses.

WALTER JOHN BEATTIE

Witnesses:
ELISABETH L. STYRING,
ANNA E. HODGKIN.